Figure 3:
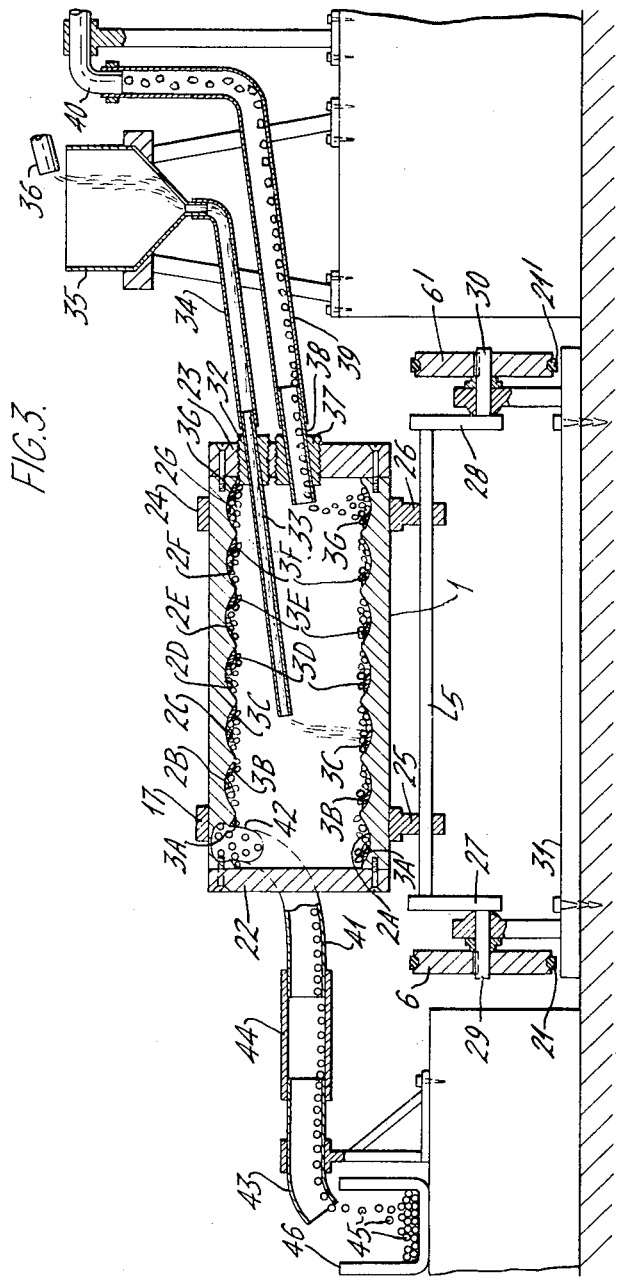

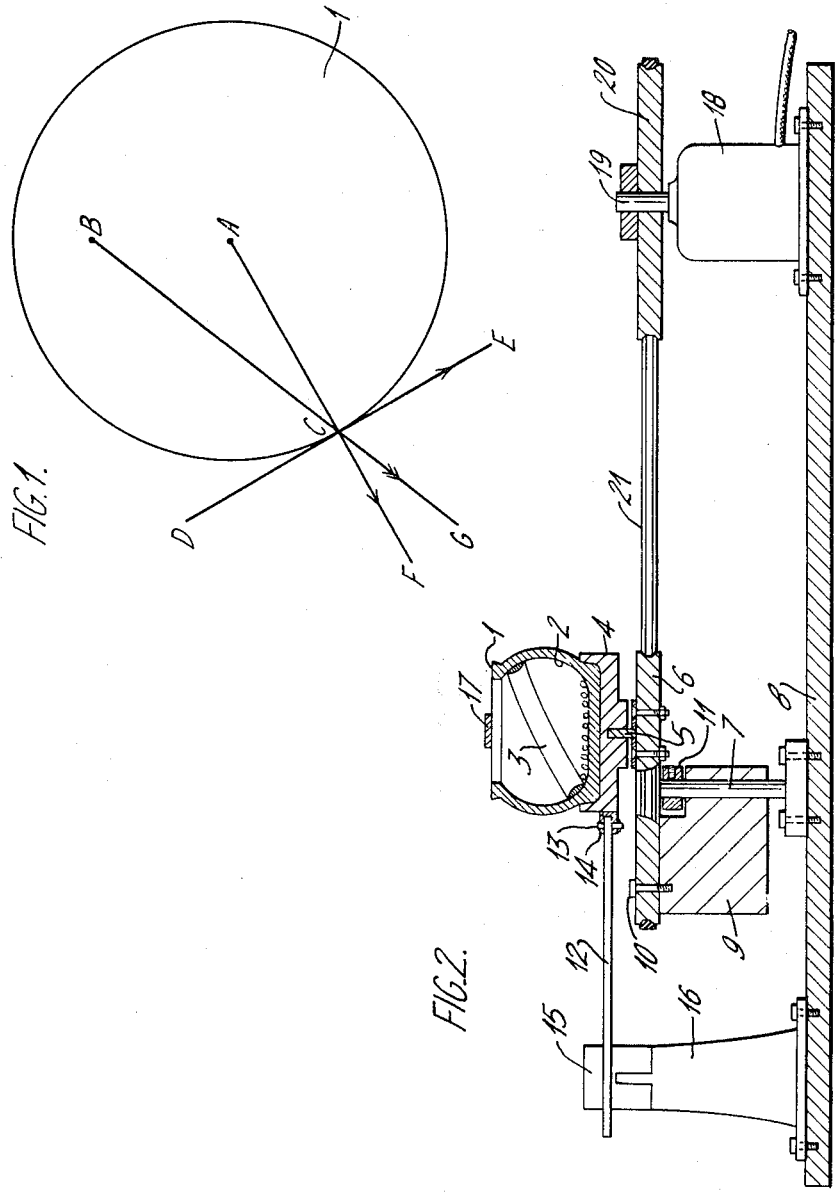

3,231,638
AGGLOMERATION PROCESS FOR PRODUCING SPHEROIDS FROM NUCLEAR FUEL CERAMIC POWDER
Keith Henry Garrett, Basingstoke, England, and Albert Graham Adwick and Eric Richard Batchelor, Thurso, Caithness, Scotland, assignors to United Kingdom Atomic Energy Authority, London, England
Filed Mar. 26, 1963, Ser. No. 268,040
Claims priority, application Great Britain, Mar. 28, 1962, 11,975/62
14 Claims. (Cl. 264—.5)

This invention relates to granulation processes in which particles or the like of a material in bindable form are agglomerated into spheroidal granules, and it has its prime application in the agglomeration of ceramic powder to spheroidal granules which can be hardened and used as a nuclear fuel.

It is known to produce spheroidal granules by placing the material in a drum which is slowly rotated to tumble and cascade the material. In this known process it is essential for the material to fall away from the inner surface of the drum. If the drum speed rises too high material is, at first, carried up in the drum and projected through the air. This causes a rapid increase in granule growth and the larger granules exert a pulverising action on the smaller granules. As a consequence there would be produced a small number of very large granules. At higher drum speeds the material is carried round with the drum and becomes a single lump.

The density of the granules so produced is low and the granules contain, after drying, large quantities of gas, usually air.

Furthermore it is difficult to control the size of the granules. In the known drum process the density of the granules increases with greater residence time, but the granule size also increases. Thus the production of small, high density spheroidal granules, as are required for nuclear fuel purposes has not been possible.

This invention provides a granulation process which can be used to process materials to be used as nuclear fuel, without raising criticality hazards, and it provides a process which produces high density spheroidal granules which are capable of being dried and fired to produce hard granules almost totally devoid of pores and entrapped gas.

The invention consists in a granulation process for agglomerating powders or the like into spheroidal granules which comprises forming agglomerates of irregular shape from the powder or the like and subjecting the said agglomerates to centrifugal force on a smooth-contour surface inclined at an angle to the said centrifugal force so that the agglomerates roll over the said surface and form granules of spheroidal shape.

The centrifugal force is preferably exerted as a result of movement of the said surface. The surface is desirably a closed loop forming the curved interior of a pot, drum, cylinder or the like, in which case the pot, drum, cylinder or the like is mounted on a moving centre which follows a locus about a fixed centre.

The motion in space of the said surface may be complex but it can be achieved satisfactorily by simple means. It is necessary, when the surface is a closed loop, that the pot, drum, cylinder or the like should have a turning motion with respect to the fixed centre. By the term "turning" is meant a rotation such that an observer standing on the fixed centre and pointing always at the moving centre would observe rotation of the containment means.

The turning motion may be either oscillatory or continuous. The oscillatory motion is more convenient in practice since it can be generated by causing the pot, cylinder, drum or the like to be oriented in the direction of a fixed point outside the area enclosed by the locus of the moving centre. A "big end" motion is a good example of this. An alternative method of generating the oscillatory turning motion about the moving centre is to connect the pot, cylinder, drum or the like to a fixed point outside the area enclosed by the locus of the moving centre by means of a pair of pivotally connected rods or bars so that the pot, cylinder or the like is held oriented in the direction of the pivotal connection between the said rods or bars.

It has been found that a centrifugal force in the range 10 to 30 times the force of gravity can be used. A force of 20 times the force of gravity can be obtained at 400 r.p.m. in a drum of 4½ inch diameter whose moving centre follows a circular locus of 1″.

Conditions for other sizes of apparatus can be found by simple experiment. All that is needed is to find the speed at which the material moves round the inner surface and does not shake about or cascade.

The forces used are such that gravity itself has only a small effect, and therefore the moving centre can move in a plane which may be vertical or inclined to the horizontal.

The nature of the surface itself plays some part in the conduct of the process. In order for the surface to induce a rolling motion into the powder and granules there must be some interaction which is of a frictional character. An absolutely smooth unbroken surface has been found to be of little practical use. Thus for example when a porcelain pot was used until its inner wall was highly polished by the powder and granules, spheroidisation no longer occurred. Sand blasting of the surface gave an improvement but the wall soon became polished again.

A solution to the problem thus presented has been achieved by providing an interruption to the said surface, which interruption provides a shallow wall crossing the direction of movement of the granules, powder or the like. The interruption is sufficiently shallow to allow powder or the like and granules to pass over it. One form of interruption comprises a band raised from the said surface. The effect of the band appears to be to give the granules rotation about an axis at an angle (other than 90°) to the plane of movement of the moving centre. This improves the granule circulation and tends to reduce ovality of the granules.

It is normally necessary to use a binder mixed with the powder or the like. Agglomerates of irregular shape are formed by extrusion through a mesh, or agitation in a mixer. The agglomerates must have sufficient binder to ensure plasticity under the granule forming conditions. It has been found that the agglomerates tend to stick together and form granules which are larger than desired. This tendency can be checked by mixing the binder with less than the final desired proportion of powder or the like to form a wet crumbly mix and subsequently adding the remainder of the powder, with agitation. It is possible to separate the resulting agglomerates into size ranges by sieving since they are dry on their surfaces.

During the conduct of the granulation process binder is squeezed out of the agglomerates and wets their surfaces. Any tendency for the agglomerates to stick together during the process can be prevented by adding small quantities of powder to dust the surfaces as they became wet. The powder may be different from the powder already used if this is desired.

Further quantities of binder and powder may be added separately to build up the size of already formed spheroidal granules. This enables undersize granules to be recycled and built up to the desired size. There is a maximum size of spheroidal granule which can be produced at any value of applied centrifugal force, dependent on type of binder and material.

Under the conditions of the granulation process, the powder or the like and the granules are subjected to high centrifugal forces and they therefore spread freely, rather as would a liquid, over the surface upon which they roll. It has been found that the surface should be shaped to act as a shallow trough to provide some retention of the powder or the like and the granules.

The distinction between the interruption above mentioned and the walls of the shallow trough should be clearly understood. The interruption crosses the path of the moving powder or the like and granules, whereas the walls of the shallow trough are parallel to the direction of movement of the granules, powder or the like. A plurality of parallel troughs may be formed on the inside of a cylinder or drum for use in the process of the invention.

Materials which can be granulated by the invention include metals, metal oxides, metal carbides and ceramic materials in general. The process can be used on a wide variety of materials and is not limited to those mentioned.

The type of binder is of great importance and it must be capable of holding the agglomerate together as the agglomerate is shaped and compacted. Preferred binders are of the type which can be removed by evaporation without decomposition from the granule.

The preferred binders are liquids chosen from alcohols having more than 6 carbon atoms. Alcohols which give the best shape as well as high density are n-octanol, n-decanol, iso-hexanol, a 40 to 60% mixture by volume of hexan-1.6 diol and water, and a 40 to 60% mixture by volume of iso-hexanol and n-decanol.

The binder content has an influence on the process. A binder content of 4 to 12% of the total weight is preferred for granules formed by agglomerate powder of particle size less than 50 microns. 7 to 10 wt. percent is preferred for powder having a surface area in the range 5 to 15 sq. meters per gram and 4 to 7% for powder having surface area of 3 to 5 sq. metres per gram.

The invention will be better understood by making reference to the accompanying drawings in which FIGURE 1 is a diagram showing the directions of the forces involved, FIGURE 2 is a sectional elevation of a batch process according to the invention and FIGURE 3 is a sectional diagram of a continuous process according to the invention.

In FIGURE 1, A is the centre of a circle 1 of radius A.C. D.C.E. is a tangent at C. B is the instantaneous centre of rotation of the circle radius A.C. Consider an infinitely small particle having mass located at C, it is subjected to a centrifugal force C.G. C.G. can be resolved into force C.F. which is normal to D.C.E., and into force C.E. which gives the particle a sideways motion at C.

The particle will therefore roll so long as there is some frictional interaction between it and the material forming the circle. It should be noted that a circle has been used for simplicity, obviously other shapes of smooth contour could be used.

In FIGURE 2 there is shown a circular porcelain pot 1 having its interior shaped to form a shollow trough 2. A raised spiral band 3 of epoxy resin runs across the trough 2. The pot 1 is supported on a saucer 4 rotatably mounted on a pin 5 fixed to a wheel 6. Wheel 6 is rotatably supported on a pin 7 firmly bolted to a base 8. A counterweight 9 is firmly fixed by screws 10 (only one being shown) to wheel 6. A recess in the counterweight 9 accommodates a collar 11 attached to pin 7 to retain the disc and counterweight. A band 17 holds pot 1 firmly on saucer 4.

A polished rod 12 is rigidly held by screw 13 in a socket 14 on saucer 4. Rod 12 slides freely in a pierced head 15 pivotally mounted on a pillar 16 bolted to base 8.

An electric motor 18 is mounted on base 8 to have its drive shaft 19 vertical. A driving wheel 20 is fixed on the drive shaft on a level with disc 6. In operation, electric motor 18 drives the disc 6 in rotary motion by means of the rubber belt 21. This causes the drum 1 to swing round the fixed axis formed by pin 7. The longitudinal axis of the drum 1 remains parallel to the axis of pin 7 throughout. Polished rod 12 slides back and forth in pivot 15 and swings through a small angle governed by the diameter of the circle forming the locus of the movement of pin 5. As the speed of the motor builds up, the soft agglomerates in drum 1 begin to roll around and eventually they rise up the sides of the drum 1 and swing around the longi-axis of the drum. The speed of the motor can be increased quite considerably to raise the centrifugal forces but eventually an upper limit is reached above which the agglomerates shake about in the drum and do not swing smoothly. A rubber belt 21 transmits motion to disc 6.

In FIGURE 3 a drum 1 has its interior shaped into seven shallow troughs $2_A$–$2_G$, each trough being crossed by raised spiral bands $3_A$–$3_G$. End plates 22 and 23 are screwed to drum 1.

Drum 1 is tightly held by strong metal bands 17 and 24. Journals 25 and 26 are rotatably mounted on a shaft 5 connected by cranks 27 and 28 to shafts 29 and 30 which are rotatably mounted on a frame 31. Bands 17 are rigidly attached to arms (not shown) extending upwards from the plane of the paper. The arms are pivotally connected to links which themselves are pivoted to the frame at a distance from the drum 1.

Rubber belts 21 and $21^1$ transmit drive from an electric motor (not shown) to wheels 6 and $6^1$. A sleeve 32 holding a tube 33 is screwed into end plate 23. Tube 32 is connected by a flexible tube 34 to a funnel 35 located below the outlet of a feed tube 36 for dry powder or the like dispersed from a vibratory feeder (not shown).

A sleeve 37 is screwed through end plate 23 and carries a tube 38 connected by a flexible tube 39 to a feed tube 40 supplying preformed agglomerates of irregular shape.

A cranked tube 41 enters drum 1 tangentially at port 42. Tube 41 is connected to short tube 43 by a flexible tube 44. Tube 43 feeds the formed spheroidal granules 45 into a transfer channel 46 for transferring the granules to a separator for separating granules of desired size and sphericity. The granules have for illustrative purposes been shown oversize.

In operation rubber belts 21 and $21^1$ drive wheels 6 and $6^1$ round and this rotates cranks 27 and 28 about the fixed centres formed by shafts 29 and 30, thereby moving shaft 5 in a circle centered on the fixed axis common to the shafts 29 and 30. Drum 1 is carried round in a circular swinging motion by the shaft 5 and is kept upright on top of the shaft 5 by the arms (not shown). Since the drum rises and falls during this motion, it executes a slight oscillatory turning motion with respect to the frame.

As in the embodiment shown in FIGURE 2, the agglomerates stay in their rest position until the speed of the rubber belts 21 and $21^1$ builds up to a value at which the drum throws the agglomerates up the sides of the drum. Initially, of course, the agglomerates will be thrown only a short way and will then fall back, but eventually as the speed builds up they are thrown right over the top of the drum interior and they begin to swing round the drum. By tilting the frame 21 the agglomerates can be induced to travel towards the exit port 42.

In an example of the invention carried out on apparatus as shown in FIGURE 2, mixed uranium and plutonium oxides in powder form of particle size below 50 microns and surface area of 10 sq. meters per gram were mixed with 8 wt. percent of n-decanol to give a mass of crumbly consistency. This mass was rubbed through a sieve of mesh size 500 micron to form agglomerates of irregular shape. Agglomerates of size less than 150 microns were removed and 125 gms. of the remainder were placed in a porcelain pot of diameter 4½″ whose center follows a circular locus of diameter 2″ at 400 r.p.m. Dense granules of spheroidal shape and average size 500 micron were obtained in good yield.

In another example the powder had a surface area of 4 sq. metres per gram and the amount of the binder was reduced to 5 wt. percent. 75% of the powder to be used was mixed with the binder to form a wet crumbly mix and powder added with beating and agitation until 96% of the total required powder had been used. Agglomerates of size in the range 300–700 micron were separated by sieving and transferred to the porcelain pot where they were spun at 400 r.p.m. After 5 minutes spinning the agglomerates began to be wetted by binder being squeezed out. A further 2% of powder was added to dust the partly spheroidized agglemerates to prevent sticking. Spinning and granulation were continued for a further 10 minutes, during which time the agglomerates became wet again and were dusted with the remainder of the powder. The granules produced were of good shape in the range 300–700 micron, the average size being 500 micron. The density of the spheroidal granules was 6.8 gm./cc., equivalent to 62% of the density of the solid $UO_2$—$PuO_2$ mixture.

In an example of the invention using apparatus shown in FIGURE 3 of the accompanying drawing the drum had a diameter of 6″ and a length of 18″. It was mounted to give its moving centre a locus of radius 1″, and had a slight slope to the left of the drawing.

Irregular agglomerates produced as in the previous example were fed in continuously as the drum was oscillated at 400 r.p.m.

A small quantity (2%) of the total powder was fed in continuously to dust the granules at a point ⅔ along the drum. The product consisted of spheroidal granules of good shape in the size range 100–700 micron and density 6.8 gm./cc.

Granules of size below 100 micron and granules of relatively poor shape were recycled to the initial pre-agglomeration stage and mixed with further quantities of binder and powder.

In tests using the known slow drum rolling process the maximum density which could be achieved was, for particles in the above size range, 4.92 gm./cc. The density of the spheroidal granules has an important influence on the density of the fired spheroids. Higher densities of the product before firing give higher densities after firing. Thus the density of the fired granules obtained using the product of density 4.92 gm./cc. was 75% of the density of the solid $UO_2$—$PuO_2$ mixture whereas the density of the granules obtained after firing the spheroids produced by the invention was 96%.

Binders of the kind given above can be driven off by slow application of heat below the boiling point of the binder to avoid cracking the granules. Heating in an inert gas stream is advantageous, nitrogen being preferred. Slow initial heating at 100° C./hour up to 200–250° C. gives good results with the higher alcohols. The dried oxide particles can be subsequently fired at 1700° C. to improve their hardness.

We claim:
1. A process for converting powder into high density spheroidal granules which comprises forming the powder into a plurality of soft agglomerates of paste consistency, containing the said agglomerates within a cylindrical drum, swinging the said drum round a fixed axis parallel to the longitudinal axis of the said drum, turning the said drum relative to the said fixed axis, and controlling the angular velocity of the said drum around the said fixed axis within the range in which the said agglomerates swing around the inside of the said drum with an angular velocity equal to the aforesaid angular velocity and are pressed against the said wall by centrifugal forces greater than gravity.

2. A process as claimed in claim 1 in which the said centrifugal forces are in the range 10–30 times the force of gravity.

3. A process as claimed in claim 1 in which the said inside walls of the said drum are provided with discontinuities which present a shallow rising step lying in the path of the said rolling agglomerates and at an angle thereto to turn the rolling agglomerates sideways from their original path, the height of the step being low so that the said agglomerates roll over the said step without disintegrating.

4. A process for converting powder into high density spheroidal granules, said powder being chosen from the group consisting of oxides and carbides of uranium and plutonium, which comprises mixing the said powder with a binder liquid to form a plurality of soft agglomerates of paste consistency, containing the said agglomerates within a cylindrical drum, swinging the said drum round a fixed axis parallel to the longitudinal axis of the said drum, turning the said drum relative to the said fixed axis, and controlling the angular velocity of the said drum round the said fixed axis within the range in which the said agglomerates swing around the inside of the said drum with an angular velocity equal to the aforesaid angular velocity and are pressed against said wall by centrifugal forces greater than gravity.

5. A process as claimed in claim 4 in which the said centrifugal forces are in the range 10–30 times the force of gravity.

6. A process as claimed in 4 in which the said spheroidal granules are heated to evaporate the said binder and form dry spheroidal granules.

7. A process as claimed in claim 4 in which the said spheroidal granules are heated to evaporate the binder and dry the said granules, and the said dried granules are fired at high temperature to increase the strength and the density of the said spheroidal granules.

8. A process as claimed in claim 4 in which the quantity of binder is 7 to 10% by weight of the powder and the surface area of the powder is in the range 5 to 15 sq. metres per gram.

9. A process as claimed in claim 4 in which the quantity of binder is 4 to 7% by weight of the powder and the surface area of the powder is in the range 3 to 5 sq. metres per gram.

10. A process as claimed in claim 4 in which the binder is an alcohol having more than 6 carbon atoms in the molecule.

11. A process as claimed in claim 10 in which the alcohol is selected from the group of n-octanol, n-decanol or iso-hexanol.

12. A process as claimed in claim 10 in which the binder is a mixture of 40 to 60% by volume of iso-hexanol with 60 to 40% of n-decanol.

13. A process as claimed in claim 10 in which the alcohol is mixed with water.

14. A process as claimed in claim 13 in which the binder comprises a mixture of 40 to 60% by volume of hexan-1.6 diol with 60 to 40% of water.

(References on following page)

References Cited by the Examiner

UNITED STATES PATENTS

| | | | |
|---|---|---|---|
| 1,239,221 | 9/1917 | Rodman | 18—48 |
| 2,543,898 | 3/1951 | De Vaney | 18—47.5 |
| 2,638,686 | 5/1953 | Stirn et al. | 18—47.5 |
| 2,711,557 | 6/1955 | Russell | 18—1 |
| 2,758,039 | 8/1956 | Barbour | 18—1 |
| 2,832,097 | 4/1958 | Ehle | 18—47.5 |
| 2,834,044 | 5/1958 | Antonsen et al. | 23—314 |
| 2,834,991 | 5/1958 | Hardman | 23—314 |
| 2,862,278 | 12/1858 | Engel et al. | 18—47.5 |
| 2,938,230 | 5/1960 | Sainty | 18—47.5 |
| 3,040,375 | 6/1962 | Rowen | 23—313 |

FOREIGN PATENTS 527,302  10/1940  Great Britain.

LEON D. ROSDOL, *Primary Examiner.*

REUBEN EPSTEIN, CARL D. QUARFORTH,
*Examiners.*

R. W. MacDONALD, L. D. RUTLEDGE,
*Assistant Examiners.*